April 29, 1941.           E. L. BARRETT                 2,240,087
                          DRIVE MECHANISM
                        Filed Jan. 10, 1940

Inventor:
Edward L. Barrett
By:
Parker, Carlson, Pitzner & Hubbard
Attorneys.

Patented Apr. 29, 1941

2,240,087

UNITED STATES PATENT OFFICE 2,240,087

DRIVE MECHANISM

Edward L. Barrett, La Grange, Ill., assignor to Barrett Engineering Company, Chicago, Ill., a corporation of Illinois Application January 10, 1940, Serial No. 313,267

5 Claims. (Cl. 74—59)

The invention relates to a novel form of drive mechanism and, more particularly, to one of the class used for converting rotary into rectilinear motion.

One object of the invention is to provide a mechanism of the class set forth which is extremely simple in form and cheap to manufacture, this low cost being achieved in a large degree through the minimization of the screw threaded or toothed parts required.

A more specific object is to provide a mechanism of the type indicated characterized particularly by the use of a tightly wound helix of wire as a rectilinearly movable driven member arranged with the convolutions of the wire helix threadably engaged in a set of complemental screw threads in a rotatable driven member. By this means the convolutions on the wire are used in effect as threads although the cost of fashioning such threads on the driven member is eliminated and at the same time all of the advantages and greater adaptability of a flexible shaft are realized for this driven member.

A further object is to provide such a drive mechanism including an electric motor from which power is to be derived and having a hollow rotatable shaft in which an axially movable wire helix is threaded so that even high speed rotation of the motor can be converted into relatively low speed rectilinear movement of the helix or driven member without the interposition of expensive and bulky speed-reduction gearing or the like.

Further objects and advantages of the invention will become apparent as the following description proceeds, taken in connection with the accompanying drawing in which.

Figure 1:
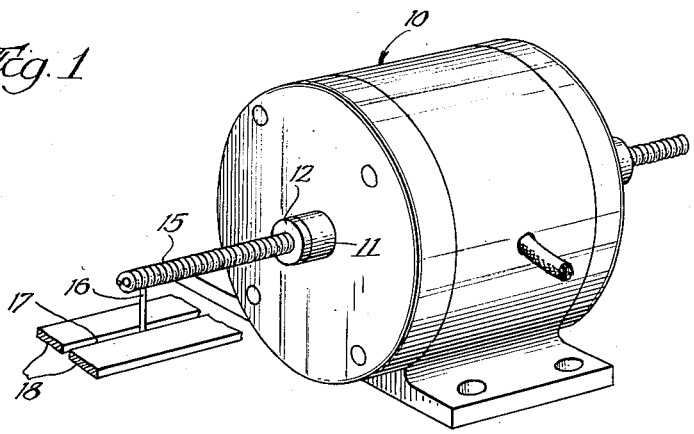
Figure 1 is a general perspective view of a drive mechanism embodying the present invention.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary embodiment of the invention the illustrated drive mechanism (Fig. 1) includes an electric motor 10, which may be of conventional form except that its usual rotatable armature shaft 11 is hollow. The motor is bolted in position or otherwise stationarily mounted and its shaft 11, though freely rotatable, is, of course, restrained against endwise movement.

Figure 2:
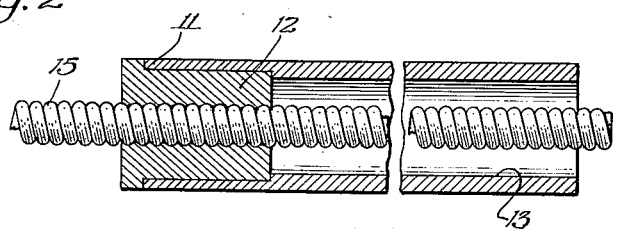
Fig. 2 is an enlarged longitudinal sectional view of the armature shaft, of the motor shown in Fig. 1, and showing a portion of the wire helix threaded in it.
Figure 3:
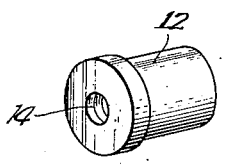
Fig. 3 is an enlarged detail perspective view of a bushing fixed in the armature shaft of Fig. 2.
Figure 4:
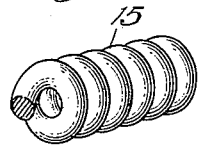
Fig. 4 is an enlarged detail perspective view of a portion of the wire helix driven member.

In the interior of the motor shaft 11, or, in other words, the driving member of the mechanism, is means forming an interior screw thread. To save the cost of threading the steel shaft itself a more easily machined bronze bushing 12 (Figs. 2 and 3) is force-fitted or otherwise rigidly secured in the end of the axial bore 13 in the shaft and suitable interior screw threads 14 are provided in this bushing.

Extending axially through the shaft bore 13 and threadably engaged in the bushing 12 is a rectilinearly movable driven member 15. In accordance with the present invention this member 15 comprises a helix of wire so formed as to mate with the bushing threads 14. By so forming the driven member it can be made very cheaply as compared to the cost of screw shafts of equal length and yet it has the added advantage of flexibility, when made from flexible wire, so as to greatly increase the fields of adaptability and use of the mechanism. This driven member may, if desired, be connected to some member (not shown) which is to be moved by it.

Any suitable means is provided for restraining the wire helix 15 against rotation while leaving it free for axial movement. Simply by way of more or less diagrammatic exemplification this means has been indicated herein (Fig. 1) as comprising a pin 16, rigid with the helix 15, and received in a guideway slot 17 between stationary guide plates 18.

With the parts arranged as described, the operation will be plain. As the motor shaft 11 rotates, during operation of the motor, the bushing 12 threads along the helix 15 moving the latter endwise in one direction or the other, depending upon the direction of motor rotation.

As to the particular form of the helix 15, it is desirable that it be tightly wound with its successive convolutions in substantially touching face-to-face engagement. This aids in giving it sufficient rigidity to prevent inadvertent bending, while still permitting it to be flexed when desired, and also conditions it to mesh with threads 14 of standard form in the bushing. Also, to insure the requisite rigidity it is desirable that the outside diameter of the helix be only about three times the diameter of the round wire from which it is formed. The member 15 is preferably sufficiently resilient and flexible in a lateral direction that it can be doubled upon itself without permanent distortion.

Simply by way of example of a suitable set of related sizes for the parts, if the motor shaft is, say, one-fourth inch in diameter, as is common in many small motors, then the helix 15 may be made from 0.0250 inch diameter standard steel piano wire. This wire is permanently coiled in a helix of 0.078 inch outside diameter, the root diameter of the hushing threads 14 being the same. In such case, if the helix convolutions are very close together, as set out above, there will be about forty convolutions per inch of length of the helix, or, in other words, it will be forty pitch. This pitch is matched with that of the threads in the driving member.

By the general arrangement set forth a very large speed reduction can be achieved without the necessity of using an expensive speed reduction gearing. For example, with a forty pitch helix, as described, if the motor speed is quite high, say 1600 R. P. M., the driven member 15 will be advanced at the rate of only forty inches per minute.

From the foregoing, it will be appreciated that a highly simplified and efficient drive mechanism has been provided which is capable of a wide variety of uses. Simply as suggestive of the latter it may be noted that the mechanism might be used advantageously in various radio apparatus such as in reeling in and out a vehicle antenna (such, for example, as shown in my copending application Serial No. 335,569, filed May 16, 1940) and for operating a station selector type tuner.

I claim as my invention:

1. In a drive mechanism, the combination of a drive member having an aperture therein, said aperture having interior screw threads therein, means supporting said drive member for rotation about an axis coaxial with said screw threads and for restraining said member against movement endwise of said axis, a driven member comprising a resilient metal wire of round cross section coiled in a long helix of uniform diameter and with the outside diameter of the helix equal to approximately three times the diameter of the wire, successive convolutions of the wire in the helix being disposed in substantially touching face-to-face relation, the convolutions of said helix being of the same pitch as the screw threads in said drive member and threadably engaged with said screw threads, and means restraining said helix against rotation while leaving it free for endwise movement.

2. The combination with a rotatable driving member having an interiorly threaded bore therein coaxial with the axis of rotation of such member, of a rectilinearly movable driven member comprising a flexible wire coiled in a tightly wound helix with its successive convolutions abutting against each other and projecting through said bore with the convolutions of the helix threadably engaged in the threads in said bore.

3. In a drive mechanism, the combination of an electric motor having a rotatable armature shaft with an axial bore therethrough, means presenting an interior screw thread in said bore, and a driven member comprising a flexible, resilient wire coiled in helical form and threaded in the screw threads presented in said bore, the helix of wire being so tightly coiled that the successive convolutions are in abutting face-to-face relation with each other, whereby the helix may transmit compression as well as tension forces in its endwise movement while still retaining a substantial lateral flexibility.

4. The combination with an electric driving motor having a shaft comprising a rotatably journaled tubular jacket with an interiorly threaded bushing fixed in it of substantially lesser length than the jacket, of a long, slender helix of closely spiraled flexible wire threaded in said bushing, and means for anchoring the helix against rotation while permitting endwise movement thereof through said bushing in response to rotation of said shaft.

5. The combination with an electric driving motor having a shaft comprising a rotatably journaled tubular jacket with an interiorly threaded bronze bushing fixed in it of substantially lesser length than the jacket, of a long, slender, laterally flexible helix of closely spiraled steel wire threaded in said bushing, the ratio of the diameter of the wire to that of the helix which it forms being substantially one to three, and means for anchoring the helix against rotation while permitting endwise movement thereof through said bushing in response to rotation of said shaft.

EDWARD L. BARRETT.